(12) United States Patent
Mori et al.

(10) Patent No.: US 9,715,254 B2
(45) Date of Patent: Jul. 25, 2017

(54) TABLET KEYBOARD CASE AND METHOD OF PROVIDING THE SAME

(71) Applicant: Belkin International, Inc., Playa Vista, CA (US)

(72) Inventors: Kenneth Mori, Los Angeles, CA (US); Avery Holleman, Long Beach, CA (US); Kazuyoshi Raijin Otani, Los Angeles, CA (US)

(73) Assignee: BELKIN INTERNATIONAL, INC., Playa Vista, CA (US)

( * ) Notice: Subject to any disclaimer, the term of this patent is extended or adjusted under 35 U.S.C. 154(b) by 644 days.

(21) Appl. No.: 14/081,810

(22) Filed: Nov. 15, 2013

(65) Prior Publication Data

US 2014/0139989 A1 May 22, 2014

Related U.S. Application Data

(60) Provisional application No. 61/727,583, filed on Nov. 16, 2012.

(51) Int. Cl.
*G06F 1/18* (2006.01)
*G06F 1/16* (2006.01)

(52) U.S. Cl.
CPC ............ *G06F 1/1662* (2013.01); *G06F 1/162* (2013.01); *G06F 1/1615* (2013.01); *G06F 1/1624* (2013.01); *G06F 1/1626* (2013.01); *G06F 1/1628* (2013.01); *G06F 1/1632* (2013.01); *G06F 1/1669* (2013.01); *G06F 1/1677* (2013.01)

(58) Field of Classification Search
CPC .... G06F 1/1628; G06F 1/1632; G06F 1/1662; G06F 1/1669; G06F 1/1615; G06F 1/162; G06F 1/1624; G06F 1/1626; G06F 1/1677
See application file for complete search history.

(56) References Cited

U.S. PATENT DOCUMENTS 8,230,992 B2 7/2012 Law et al.
8,242,868 B2 8/2012 Lauder et al.
(Continued)

FOREIGN PATENT DOCUMENTS

AU 2011100684 A4 7/2011
AU 2011265093 A1 1/2013
(Continued)

OTHER PUBLICATIONS

The International Search Report and Written Opinion, 13 pages dated Feb. 24, 2014.

*Primary Examiner* — Ramon M Barrera
(74) *Attorney, Agent, or Firm* — Bryan Cave LLP

(57) ABSTRACT

A case for a tablet computing device can include a first cover configured to hold the tablet computing device. The first cover can include a first attachment mechanism. The case can include a second cover. The second cover can include a keyboard, one or more second attachment mechanisms, and/or one or more sensors. The first attachment mechanism can be configured to couple with the one or more second attachment mechanisms to hold the case in an open keyboard configuration such that the keyboard is uncovered and a screen of the tablet computing device is uncovered. The keyboard can be turned on when the one or more sensors detect that the case is in the open keyboard configuration.

24 Claims, 12 Drawing Sheets

(56) References Cited

U.S. PATENT DOCUMENTS

| | | |
|---|---|---|
| 8,253,518 B2 | 8/2012 | Lauder et al. |
| 8,264,310 B2 | 9/2012 | Lauder et al. |
| 8,281,924 B2 | 10/2012 | Westrup |
| 8,289,115 B2 | 10/2012 | Cretella, Jr. et al. |
| 8,312,991 B2 | 11/2012 | Diebel et al. |
| 8,328,008 B2 | 12/2012 | Diebel et al. |
| 8,344,836 B2 | 1/2013 | Lauder et al. |
| 2004/0169995 A1 | 9/2004 | Ghosh et al. |
| 2006/0007645 A1 | 1/2006 | Chen et al. |
| 2011/0297566 A1 | 12/2011 | Gallagher et al. |
| 2011/0298345 A1 | 12/2011 | Shortt et al. |
| 2012/0024918 A1 | 2/2012 | DeCamp et al. |
| 2012/0043247 A1 | 2/2012 | Westrup |
| 2012/0044638 A1 | 2/2012 | Mongan et al. |
| 2012/0103855 A1* | 5/2012 | Gaddis, II ............. G06F 1/1628 206/521 |
| 2012/0138494 A1 | 6/2012 | Thomas |
| 2012/0140396 A1 | 6/2012 | Zeliff et al. |
| 2012/0293953 A1 | 11/2012 | Wu et al. |
| 2012/0325702 A1 | 12/2012 | Gallagher et al. |
| 2012/0327580 A1 | 12/2012 | Gengler |
| 2012/0327594 A1 | 12/2012 | Gengler |
| 2012/0327759 A1 | 12/2012 | Han et al. |
| 2013/0075281 A1 | 3/2013 | Diebel et al. |
| 2013/0098782 A1 | 4/2013 | Diebel et al. |
| 2013/0186682 A1 | 7/2013 | Gallagher et al. |
| 2013/0271373 A1* | 10/2013 | Milhe ................... G06F 1/1671 345/168 |

FOREIGN PATENT DOCUMENTS

| | | |
|---|---|---|
| AU | 2013100107 A4 | 2/2013 |
| AU | 2013100108 A4 | 2/2013 |
| CA | 2785813 | 12/2011 |
| CA | 2731761 | 2/2012 |
| CN | 102370309 | 3/2012 |
| CN | 102576239 | 7/2012 |
| EP | 2420154 | 2/2012 |
| EP | 2529281 | 12/2012 |
| JP | 2012044138 | 3/2013 |
| NZ | 594020 | 9/2011 |
| SG | 183467 | 10/2012 |
| WO | 2011139865 | 11/2011 |
| WO | 2011156275 | 12/2011 |

* cited by examiner

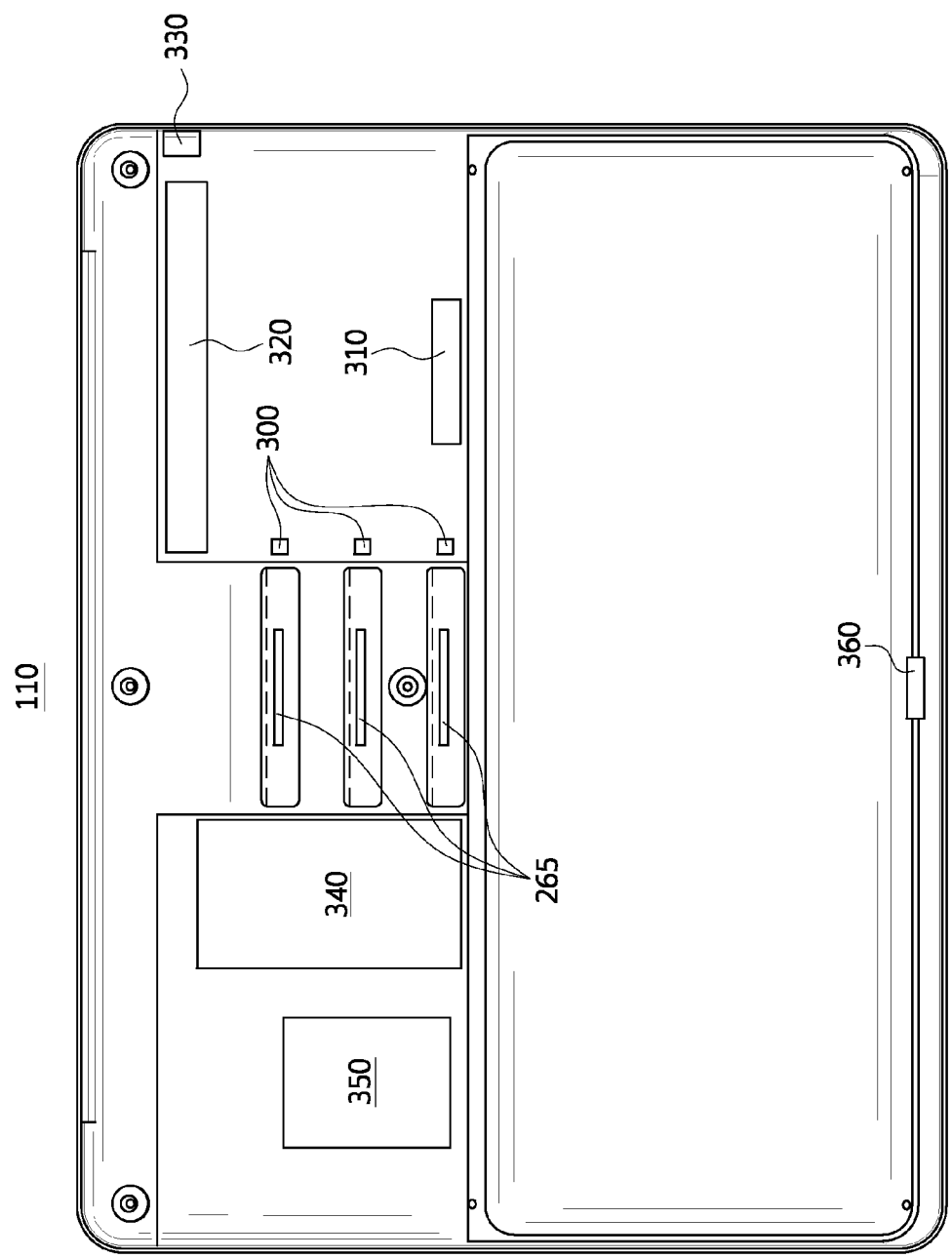

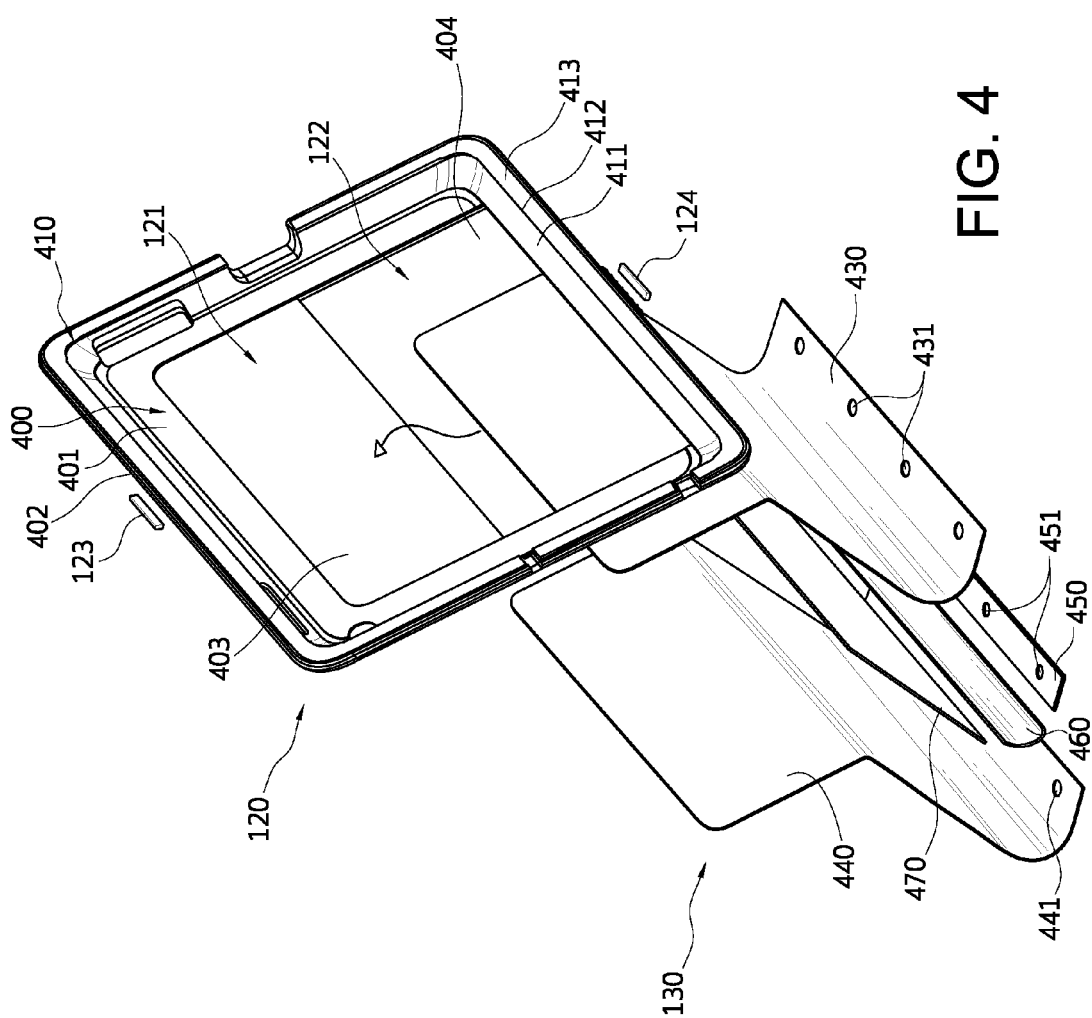

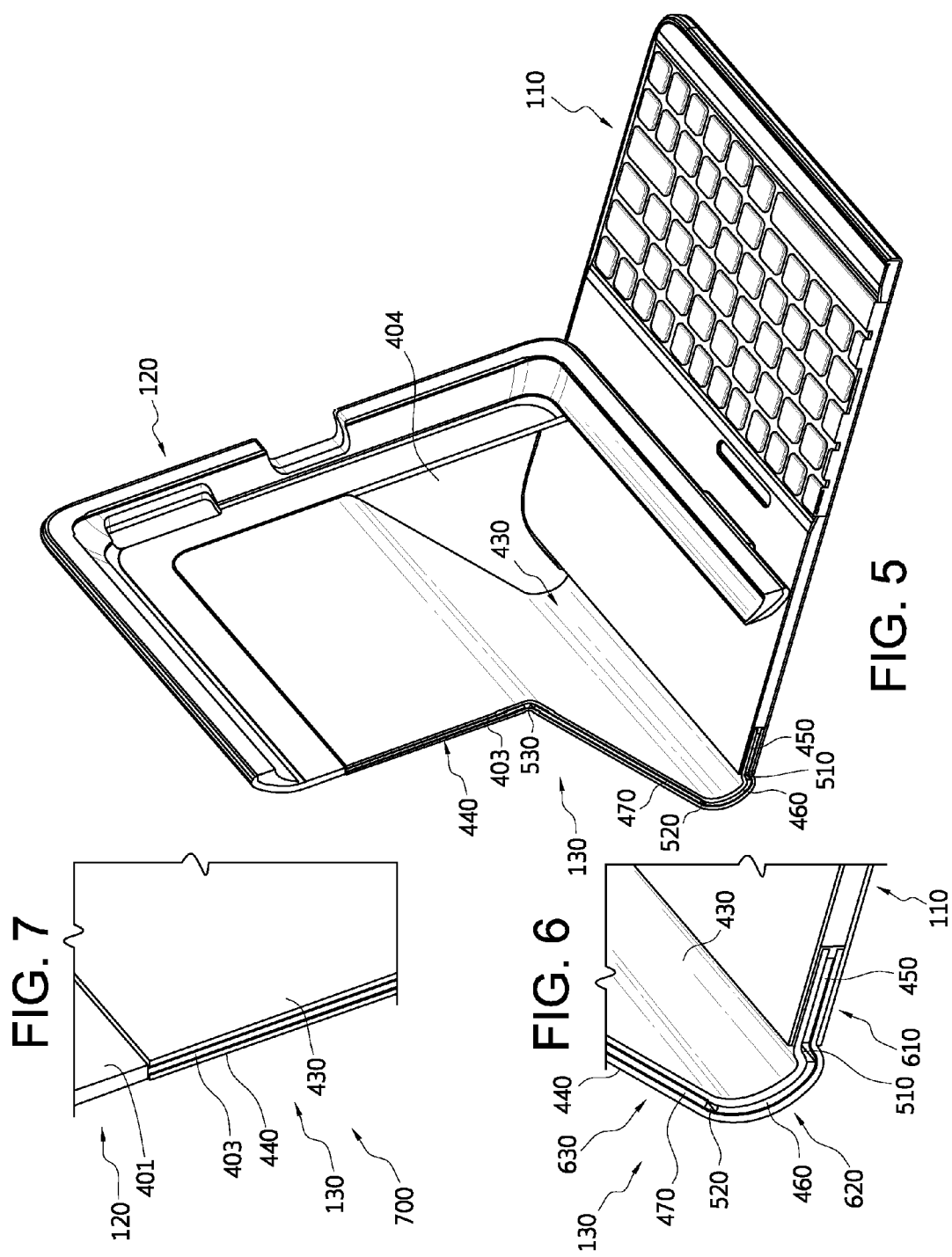

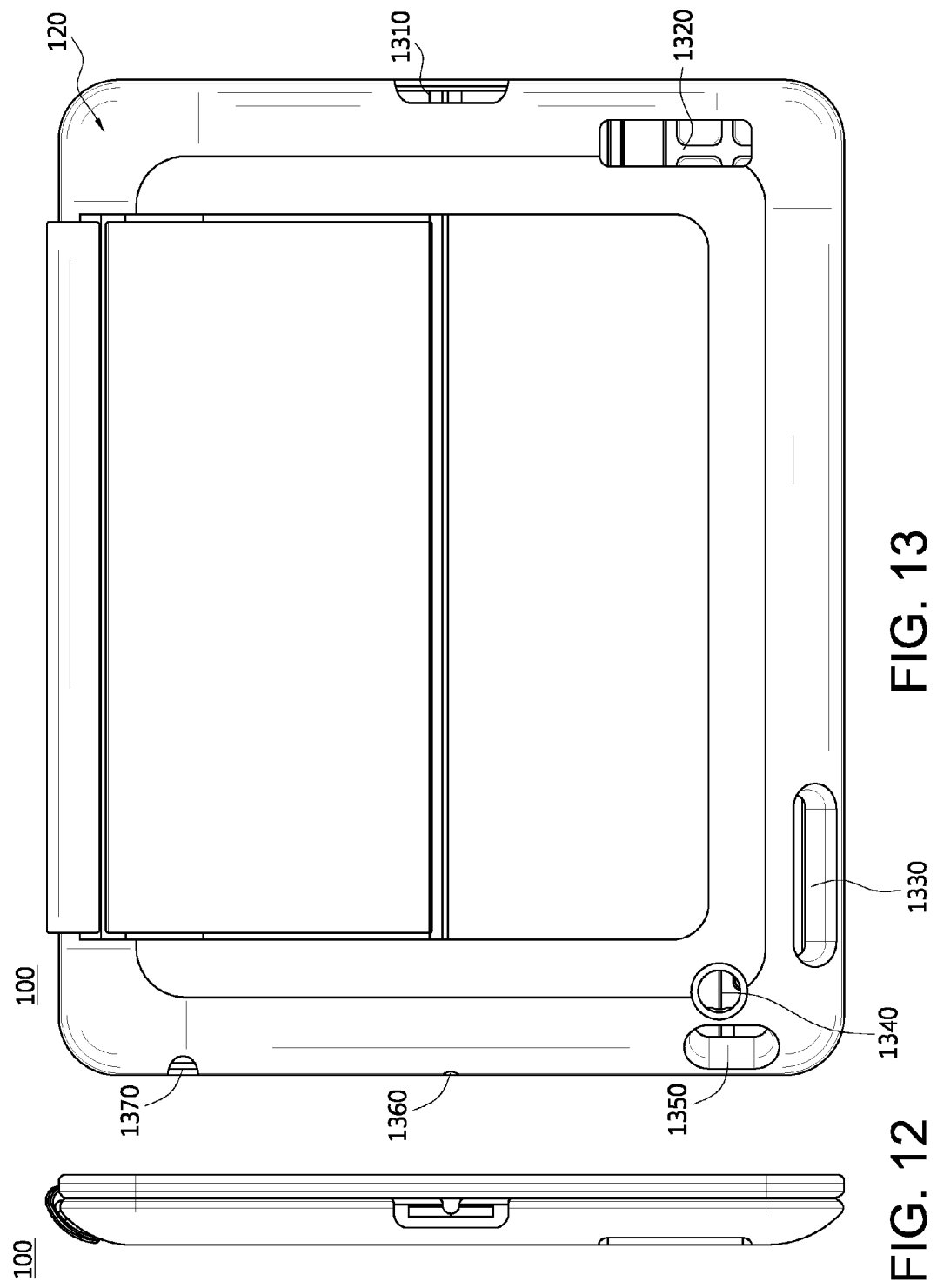

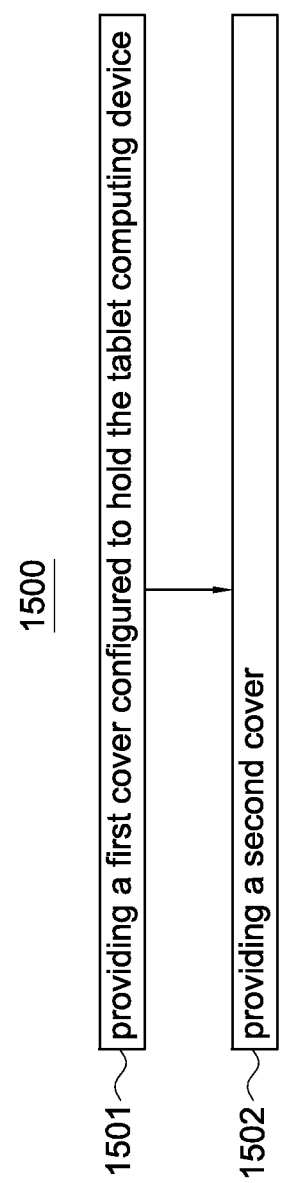

TABLET KEYBOARD CASE AND METHOD OF PROVIDING THE SAME

CROSS-REFERENCE TO RELATED APPLICATIONS

This application claims the benefit of U.S. Provisional Application No. 61/727,583, filed Nov. 16, 2012. U.S. Provisional Application No. 61/727,583 is incorporated herein by reference in its entirety.

TECHNICAL FIELD

This disclosure relates generally to holders for electronic devices, and relates more particularly to keyboard cases for tablet computing devices.

BACKGROUND

Tablet computing devices are commonly used for commercial and personal purposes. These devices are typically portable and vulnerable to damage from being dropped, hit, or scratched. Protective cases can be used to protect these devices from possible damage. It is desirable that these cases allow continued functionality of various capabilities of the devices while the devices remain held in the cases. Moreover, it is also desirable that these cases enhance the capability, functionality, and/or usability of these devices. Many tablet computing devices include a smaller on-screen virtual keyboard that simulates a physical keyboard device. Yet many users prefer the tactile response and haptic feedback of typing on a physical keyboard device over typing on an on-screen virtual keyboard. Furthermore, many users prefer a keyboard that is closer in size to a full-size physical keyboard.

BRIEF DESCRIPTION OF THE DRAWINGS

To facilitate further description of the embodiments, the following drawings are provided in which:

FIG. 3 illustrates a top plan schematic view of control circuitry for a keyboard assembly, according to the embodiments of FIG. 1, according to another embodiment;

FIG. 4 illustrates an exploded view of a tablet cover assembly and hinge assembly, according to the embodiment of FIG. 1;

FIG. 5 illustrates a side isometric cross-sectional view of a tablet keyboard case, according to the embodiments of FIG. 1;

FIG. 6 illustrates a side isometric cross-sectional view a keyboard assembly and a hinge assembly, according to the embodiment of FIG. 1;

FIG. 7 illustrates a side isometric cross-sectional view of a tablet cover assembly and a hinge assembly, according to the embodiment of FIG. 1;

FIG. 12 illustrates a right side elevational view of a tablet keyboard case, according to the embodiments of FIG. 1;

FIG. 13 illustrates a top plan view of a tablet keyboard case, according to the embodiments of FIG. 1;

FIG. 15 illustrates a flow chart for an embodiment of a method of providing a tablet keyboard case, according to the embodiments of FIG. 1.

Figure 1:
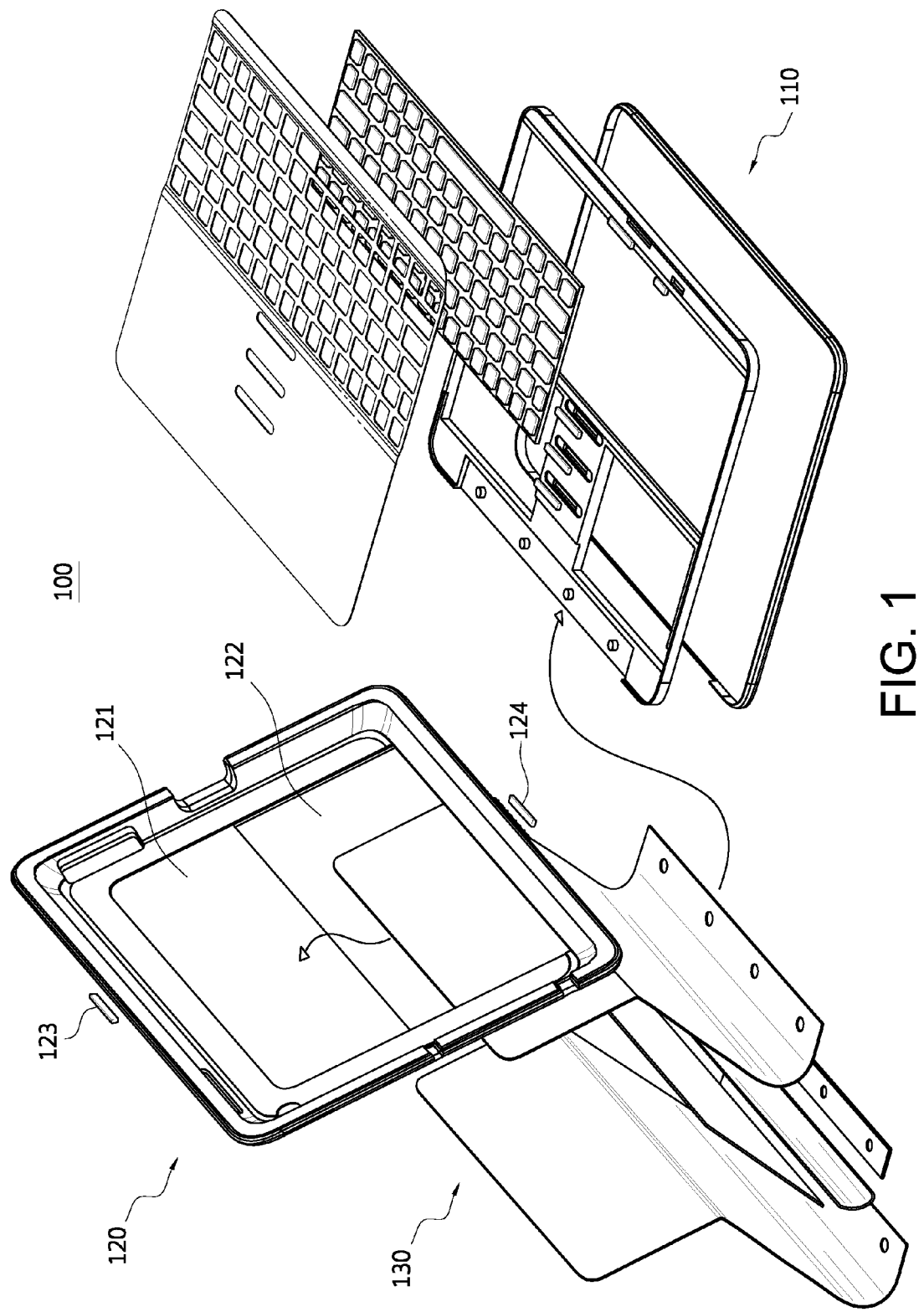
FIG. 1 illustrates an exploded view of a tablet keyboard case, according to an embodiment.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable. "Mechanical coupling" and the like should be broadly understood and include mechanical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

Some embodiments include a case for a tablet computing device. The case includes a first cover configured to hold the tablet computing device. The first cover includes a first attachment mechanism. The case further includes a second cover. The second cover includes a keyboard, one or more second attachment mechanisms, and one or more sensors. The first attachment mechanism is configured to couple with the one or more second attachment mechanisms to hold the case in an open keyboard configuration such that the keyboard is uncovered and a screen of the tablet computing device is uncovered. The keyboard is turned on when the one or more sensors detect that the case is in the open keyboard configuration. The keyboard is automatically turned off when the one or more sensors detect that the case is not in the open keyboard configuration. The case is configured to fold into a closed configuration such that the keyboard is covered by the case and the screen of the tablet is covered by the case.

Various embodiments include a case for a tablet computing device. The case includes a first cover configured to hold the tablet computing device. The first cover includes a first attachment mechanism. The case further includes a second cover. The second cover includes a keyboard and two or more second attachment mechanisms. The first attachment mechanism is configured to couple with the two or more second attachment mechanisms to hold the case at two or more viewing angles in an open keyboard configuration such that the keyboard is uncovered and a screen of the tablet computing device is uncovered.

Further embodiments include a method of providing a case for a tablet computing device. The method includes providing a first cover configured to hold the tablet computing device. The first cover includes a first attachment mechanism. The method further includes providing a second cover. The second cover includes a keyboard, one or more second attachment mechanisms, and one or more sensors. The first attachment mechanism is configured to couple with the one or more second attachment mechanisms to hold the case in an open keyboard configuration such that the keyboard is uncovered and a screen of the tablet computing device is uncovered. The keyboard is turned on when the one or more sensors detect that the case is in the open keyboard configuration.

Figure 9:
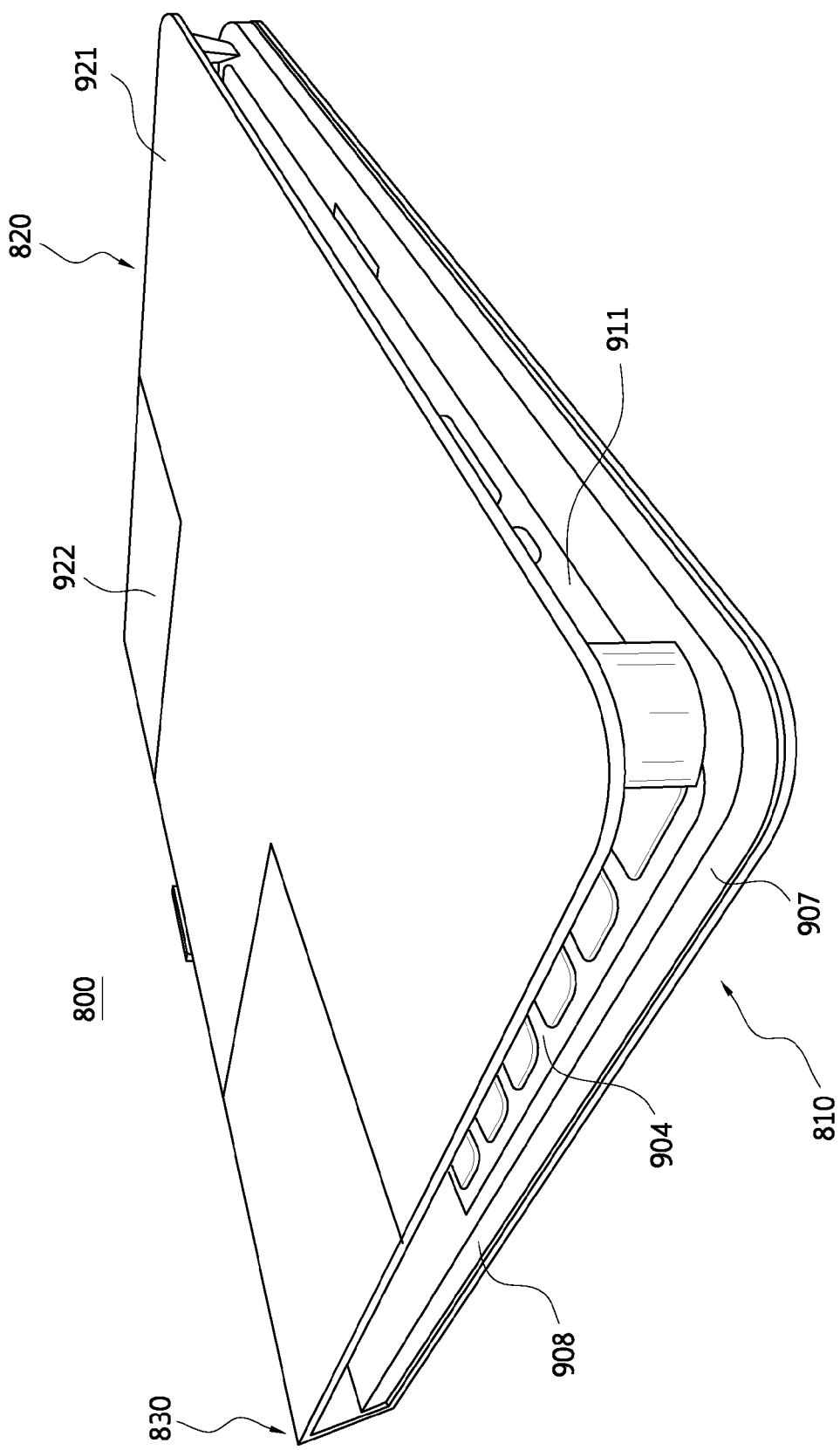
FIG. 9 illustrates a side top left front side isometric view of a tablet keyboard case, according to the embodiments of FIG. 8.
Figure 10:
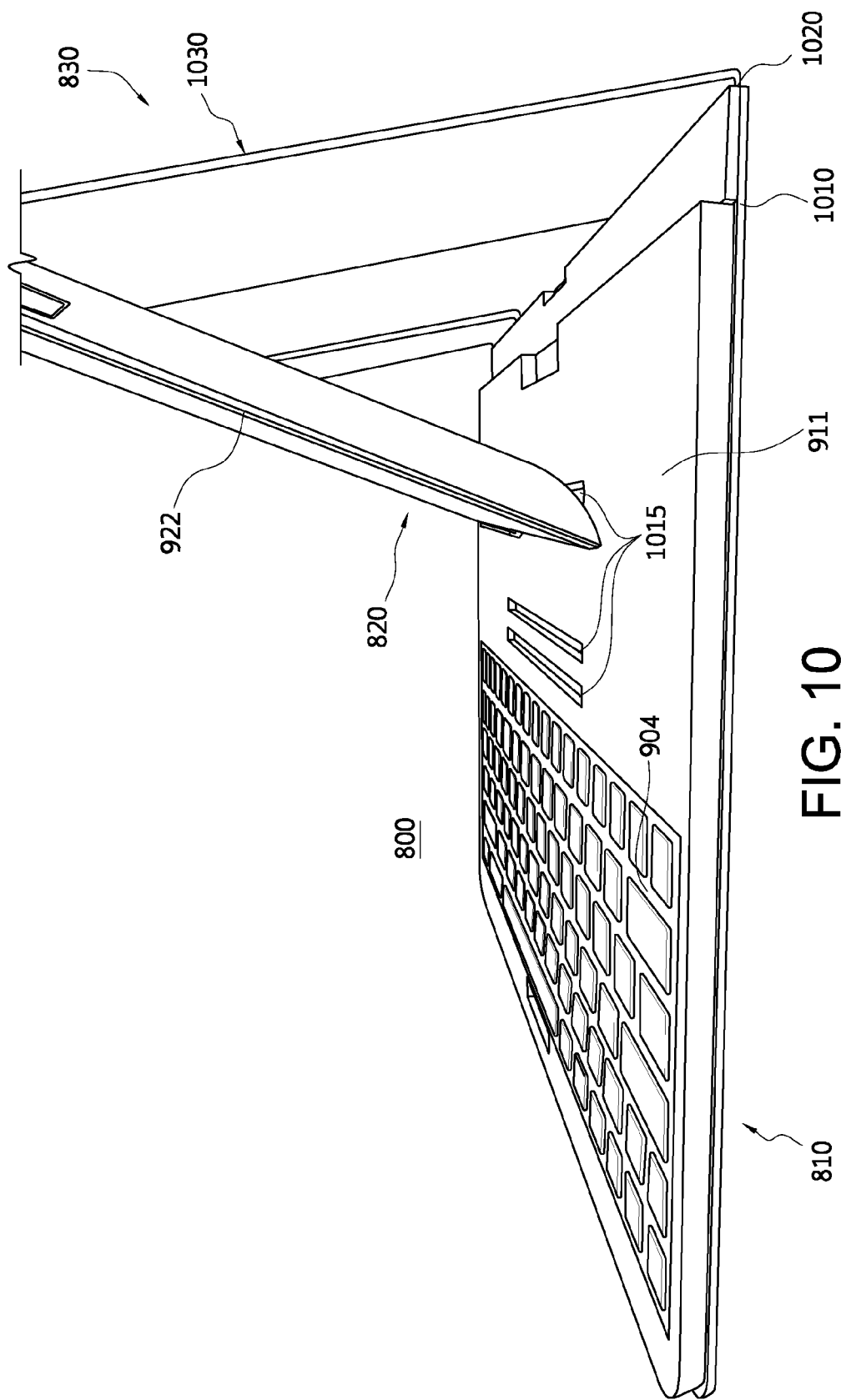
FIG. 10 illustrates a right side elevational view of a tablet keyboard case, according to the embodiment of FIG. 8.
Figure 11:
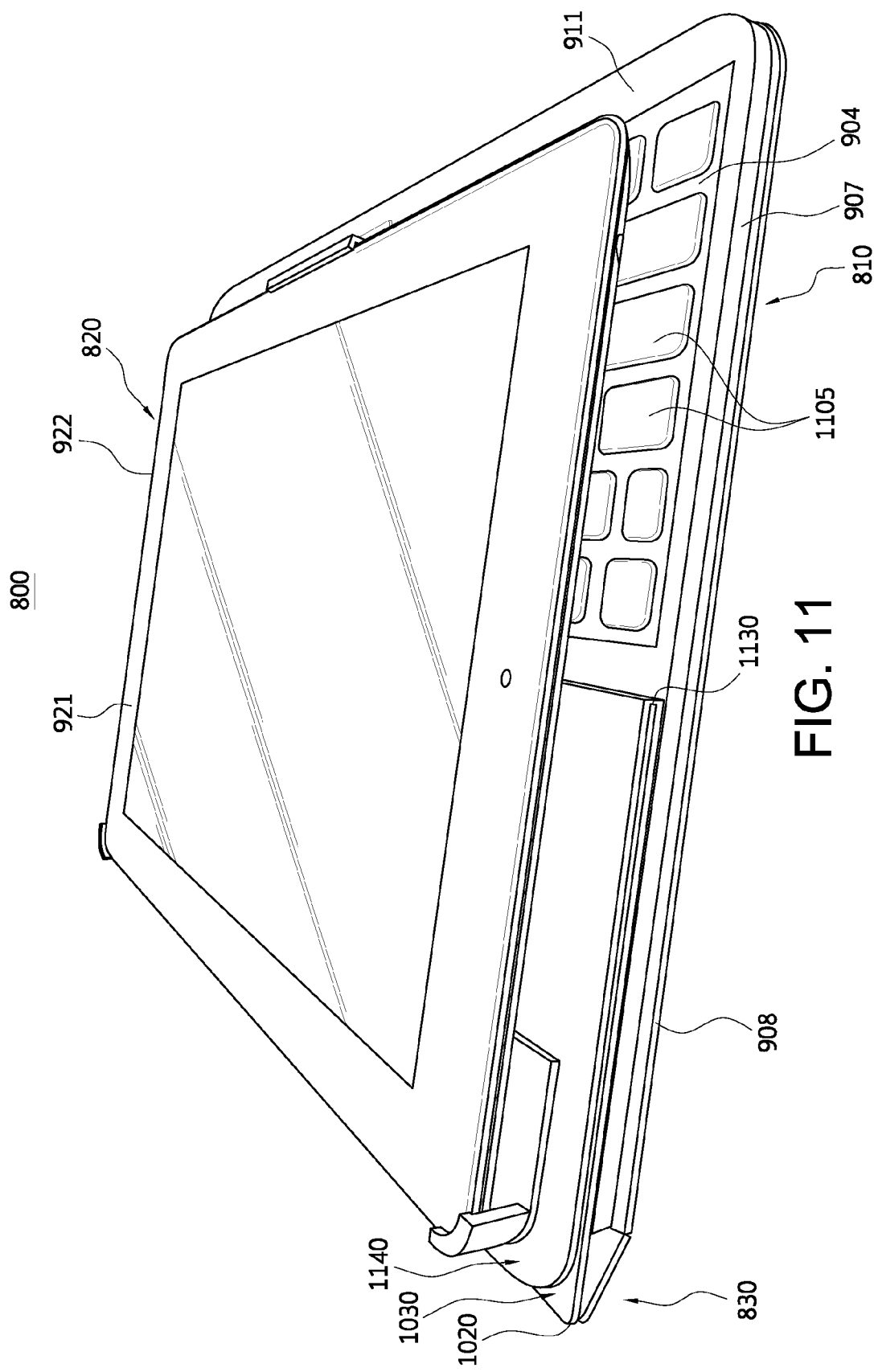
FIG. 11 illustrates a top left side elevational view of a tablet keyboard case, according to the embodiments of FIG. 8.

Embodiments of a tablet keyboard case can be configured to hold and secure a tablet computing device, such as the iPad® or iPad Mini®, developed and sold by Apple, Inc., of Cupertino, Calif.; the Kindle®, developed and sold by Amazon.com, Inc.; and/or the Samsung Galaxy Tab®, developed and sold by Samsung Group; among other tablet computing devices, and to provide a keyboard to allow a user to input information to the tablet computing device via typing on a physical keyboard. Embodiments of the tablet keyboard case can include a hinge, which can be configured to allow the tablet computing device (a) to be viewed in an open keyboard configuration (as shown in FIG. 10, described below) at various viewing angles, (b) to be closed in a closed configuration (as shown in FIG. 9, described below) in which the tablet computing device and keyboard are secured inside the case, and/or (c) to be opened in an open tablet configuration (as shown in FIG. 11, described below) in which the face of the tablet computing device is accessible but the keyboard is secured within the tablet keyboard case.

Turning to the drawings, FIG. 1 illustrates an exploded view showing various elements of a tablet keyboard case 100. Tablet keyboard case 100 is merely exemplary and embodiments of the tablet keyboard case are not limited to the embodiments presented herein. The tablet keyboard case can be employed in many different embodiments or examples not specifically depicted or described herein. In many embodiments, tablet keyboard case 100 can include a keyboard assembly 110, a tablet cover assembly 120, and/or a hinge assembly 130. In a number of embodiments, tablet cover assembly 120 can be an example of a cover. Tablet cover assembly 120 can be configured to hold a tablet computing device. In some embodiments, tablet cover assembly 120 can include a top region 121, which can include a top cover magnet 123 located at a top portion of top region 121. In various embodiments, tablet cover assembly 120 can include a bottom region 122, which can include a bottom cover magnet 124 located at a bottom portion of bottom region 122. Bottom cover magnet 124 can be an example of an attachment mechanism. In some instances, top cover magnet 123 and bottom cover magnet 124 can be magnets. In other instances, top cover magnet 123 and bottom cover magnet 124 can be protrusions or recesses instead of magnets.

Figure 2:
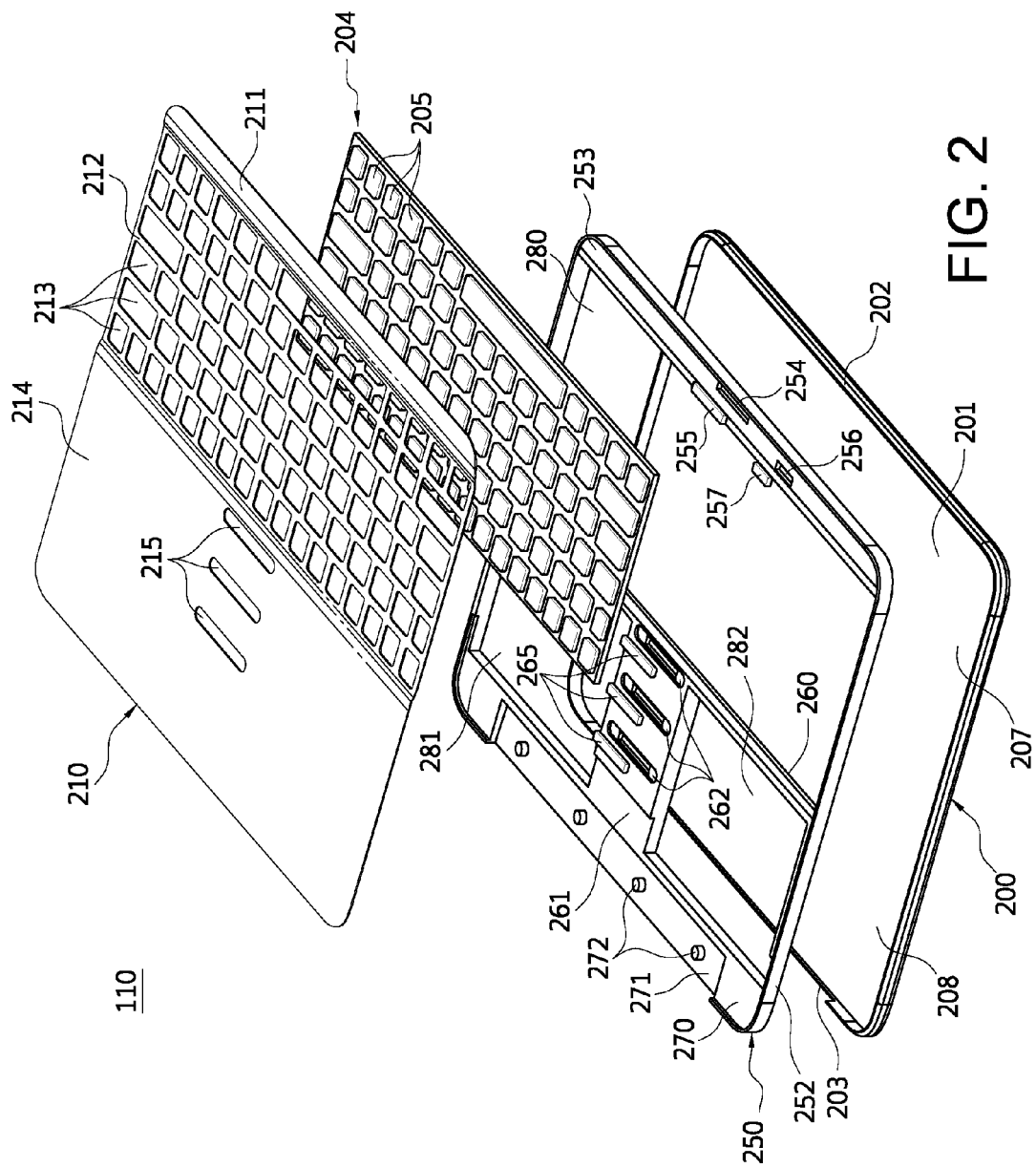
FIG. 2 illustrates an exploded view of a keyboard assembly, according to the embodiment of FIG. 1.

Turning ahead in the drawings, FIG. 2 illustrates an exploded view showing various elements of keyboard assembly 110. Keyboard assembly 110 can be an example of a cover. In many embodiments, keyboard assembly 110 can include, for example, keyboard case 200, keyboard internal frame 250, keyboard 204, and/or keyboard cover 210. In various embodiments, keyboard assembly 110 can include a front region 207 and a back region 208. In many embodiments, keyboard case 200 can include a keyboard case surface 201 and one or more keyboard case sides 202. One of keyboard case sides 202 can include a keyboard case hinge side 203 running longitudinally along back region 208, and in some embodiments case hinge side 203 is shorter than the other keyboard case sides 202. Keyboard case 200 can be made of a suitable rigid polymer (e.g., polycarbonate (PC) or acrylonitrile butadiene styrene (ABS)), metal (e.g., aluminum), and/or ceramic material. Keyboard case 200 may be thinner when made of a stamped aluminum pan than when made of a polymer. Keyboard case 200 can be configured to secure and hold keyboard internal frame 250, keyboard 204, and/or keyboard cover 210.

In some embodiments, keyboard internal frame 250 can include an outer frame 252 that is shaped to sit inside keyboard case 200. Keyboard internal frame 250 can include a front frame piece 253 that can extend longitudinally along one side of outer frame 252 and can be located in front region 207. Keyboard internal frame 250 can further include a hinge frame piece 270 that extends longitudinally along a side of outer frame 252 opposite front frame piece 253 and can be located in back region 208. Hinge frame piece 270 can include one or more hinge connector frames 271 configured to attach to hinge assembly 130 (FIG. 1). In many embodiments, a single hinge connector frame 271 is a recessed portion of hinge frame piece 270. In specific embodiments, hinge connector frame 271 can extend longitudinally along one side of hinge frame piece 270. In other embodiments, two or more hinge connector frames 271 are part of hinge frame piece 270. In a number of embodiments, hinge connector frame 271 includes one or more nubs 272 configured to interlock with hinge assembly 130 (FIG. 1). In other embodiments, hinge connector frame 271 can include ribs, texturing, or other attachment mechanisms configured to interlock with hinge assembly 130 (FIG. 1).

In a number of embodiments, keyboard internal frame 250 can include a middle rib piece 260 that can extend longitudinally across the middle of outer frame 252 and can be located between front region 207 and back region 208. Middle rib piece 260, front frame piece 253, and sides of outer frame 252 can bound a keyboard cavity 280, and can be configured to hold and secure keyboard 204 when it is placed within keyboard cavity 280 in front region 207. Keyboard internal frame 250 can further include a magnet frame piece 261 that, in some embodiments, extends transverse from middle rib piece 260 to hinge frame piece 270 in back region 208. In various embodiments, middle rib piece 260, hinge frame piece 270, outer frame 252, and magnet frame piece 261 can bound one or more internal frame cavities (e.g., 281 and 282) in back region 208. Magnet frame piece 261 can include one or more central magnet recesses 262 configured to hold and secure one or more central magnets 265. In other embodiments, central magnet recesses 262 do not hold magnets, but are instead grooves configured to hold bottom cover magnet 124 (FIG. 1) in various positions. Central magnet recesses 262 can extend partially or fully across magnet frame piece 261 and, in many embodiments, can be parallel to hinge frame piece 270. Central magnet recesses 262 can be spaced a various locations on magnet frame piece 261 between middle rib piece 260 and hinge frame piece 270 to allow for various viewing angles. Various embodiments can include 0, 1, 2, 3, 4, 5, 6, or more central magnet recesses 262 and/or central magnets 265.

In several embodiments, front frame piece 253 can include a front magnet recess 254, which can be configured to hold and secure a front magnet 255. In additional embodiments, front frame piece 253 can include a sleep magnet recess 256, which can be configured to hold and secure a sleep magnet 257. In various embodiments, sleep magnet 257 is configured to interact with a sleep/wake sensor on a tablet computing device held by tablet keyboard case 100 (FIG. 1). Various tablet computing devices, such as the iPad, use the sleep/wake sensor to sense the proximity of sleep magnet 257 and thus detect whether tablet keyboard case 100 is in a closed configuration (as shown in FIG. 9, described below), in which case the tablet computing device can put itself to sleep, including turning off its screen. If instead the sleep/wake sensor detects that the tablet computing device is in an open configuration, such as the open keyboard configuration (as shown in FIG. 10, described below) or open tablet configuration (as shown in FIG. 11, described below), tablet computing device can wake itself up, including turning on its screen. Keyboard internal frame 250 can be made of a suitable rigid polymer (e.g., PC or ABS), metal (e.g., aluminum), and/or ceramic material.

In many embodiments, keyboard cover 210 can be configured to attach to keyboard case side 202, and in some embodiments can partially or fully cover keyboard internal frame 250. Keyboard cover 210 can include a front cover region 211 configured to cover front frame piece 253. Keyboard cover 210 can include a keyboard cover region 212, which can include a plurality of key slots 213, which can be configured to allow a plurality of keys 205 on keyboard 204 to protrude through keyboard cover 210. In many embodiments, keyboard cover 210 can include a back cover region 214 located at back region 208, which can be configured to cover middle rib piece 260, magnet frame piece 260, internal frame cavities 281 and 282, and/or hinge frame piece 270. In many embodiments, keyboard cover 210 can be an integral piece extending from keyboard cover region 212 to back cover region 214. In some embodiments, back cover region 214 can include one or more central cover recesses 215, which can each be configured to be positioned substantially over each of central magnets 265 and can be configured to assist a user to locate bottom cover magnet 124 (FIG. 1) in various positions when tablet keyboard case 100 is in an open keyboard configuration (as shown in FIG. 10, described below). In specific embodiments, central cover recesses 215 can be recessed below the plane of back cover region 214 at a depth of less than 2 millimeters, and can serve as a self-aligning feature for locating bottom cover magnet 124 (FIG. 1) and/or a protrusion of tablet cover assembly 120 (FIG. 1) over central cover recesses 215 and/or central magnets 265, which can underlie keyboard cover 210. Central cover recesses 215 and/or central magnets 265 can be examples of attachment mechanisms. In these embodiments, central cover recesses do not serve as a physical support structure for securing tablet cover assembly 120 (FIG. 1) to keyboard assembly 110. In other embodiments, central cover recesses 215 can be recessed below the plane of back cover region 214 by a depth of greater than 2 millimeters and can provide a physical support structure to secure tablet cover assembly 120 (FIG. 1) to keyboard assembly 110. In still other embodiments, central cover recesses 215 are slots extending through back cover region 214, which can be located above central magnet recesses 262, and can be configured to hold and physically secure tablet cover assembly 120 (FIG. 1) to keyboard assembly 110. In still further embodiments, central cover recesses 215 are not included. In some embodiments, central magnets 265 can produce a sufficient magnetic field when magnetically coupled with bottom cover magnet 124 (FIG. 1) to remain magnetically coupled to bottom cover magnet 124 when tablet keyboard case 100 (FIG. 1) is lifted by pulling up on tablet cover assembly 120 (FIG. 1). Keyboard cover 210 can be made of a suitable rigid polymer (e.g., PC or ABS), metal (e.g., aluminum), and/or ceramic material. For example, keyboard cover 210 may be a sheet of stamped aluminum.

Turning ahead in the drawings, FIG. 3 illustrates a top plan cut-out view of keyboard assembly 110. In some embodiments, keyboard assembly 110 can include an antenna 320 configured to transmit (e.g. wirelessly transmit) keyboard input data to the tablet computing device. Antenna 320 can support one or more suitable wireless communication protocols, such as the Bluetooth® protocol. Keyboard assembly 110 can include keyboard antenna connector 310 to electrically couple keyboard 204 (FIG. 2) to antenna 320. Keyboard antenna connector 310 can be a suitable connector, such as a standard flexible printed circuit (FPC) connector. Antenna 320 and keyboard antenna connector 310 can be located within one or more of internal frame cavities 281 or 282 (FIG. 2). Some embodiments include a battery 340, which can be a power source suitable to provide electrical power to keyboard 204 (FIG. 2) and, in some embodiments, small enough to fit in one or more of internal frame cavities 281 or 282 (FIG. 2). Keyboard assembly 110 can further include a charging connector 330, which can be configured to connect to a power source and to facilitate recharging of battery 340. In some embodiments, charging connector 330 is located on keyboard case side 202 (FIG. 2). Charging connector 330 can be a suitable connector, such as a Uniform Serial Bus (USB) receptacle or a DC power supply receptacle.

In some embodiments, keyboard assembly 110 can include one or more central Hall effect sensors 300. Central Hall effect sensors can be examples of sensors. In many embodiments, central Hall effect sensors 300 are located in central magnet recesses 262 (FIG. 2), in other recesses in magnet frame piece 261 (FIG. 2) proximate to central magnet recesses 262 (FIG. 2), and/or in internal frame cavities 281 or 282 (FIG. 2) next to magnet frame piece 261 (FIG. 2). In various embodiments, there can be the same number of central Hall effect sensors 300 as central magnets 265. In other embodiments, there are fewer central Hall effect sensors 300 than central magnets 265. In some instances, central Hall effect sensors 300 are located between central magnets 265. In some embodiments, there is only one central Hall effect sensor 300. Central Hall effect sensors 300 can be configured to detect changes in magnetic force and to sense the proximity of bottom cover magnet 124 (FIG. 1) to central cover recesses 215 (FIG. 2) and central magnets 265, which can underlie central cover recesses 215 (FIG. 2). The close proximity of bottom cover magnet 124 (FIG. 1) to central cover recesses 215 (FIG. 2) can increase the magnetic force detected by central Hall effect sensors 300 to indicate that tablet keyboard case 100 (FIG. 1) is in an open keyboard configuration (as shown in FIG. 10, described below).

In some embodiments, keyboard assembly 110 can include control circuitry 350, such as printed circuit boards (PCBs) or other electrical components configured to electronically couple to and/or control central Hall effect sensors 300, keyboard 204 (FIG. 2), antenna 320, keyboard antenna connector 310, battery 340, and/or charging connector 330. Control circuitry 350 can be located in at least one of internal frame cavities 281 or 282 (FIG. 2). In various embodiments, keyboard assembly 110 does not include an on/off switch, but rather, control circuitry 350 turns keyboard 204 on or off based on the location of bottom cover magnet 124 (FIG. 1), as detected by central Hall effect sensors 300. Control circuitry, for example, can be configured to (a) turn on keyboard 204 (FIG. 2) when central Hall effect sensors 300 detect that bottom cover magnet 124 (FIG. 1) is located proximate to central cover recesses 215 (FIG. 2), and (b) turn off keyboard 204 (FIG. 2) when central Hall effect sensors 300 detect that bottom cover magnet 124 (FIG. 1) is no longer located proximate to central cover recesses 215 (FIG. 2). In some embodiments, control circuitry 350 can include a timing mechanism to turn off keyboard 204 only after a predetermined time period has elapsed following central Hall effect sensors detecting that bottom cover magnet 124 (FIG. 1) is no longer located proximate to central cover recesses 215 (FIG. 2), thus allowing a user to briefly adjust tablet cover assembly 120 (FIG. 1) without turning off keyboard 204 (FIG. 2). As an example, the predetermined time period can be 3, 5, or 10 seconds.

In several embodiments, keyboard assembly 110 can include, in some embodiments, a front Hall effect sensor 360, which can be located in or proximate to front magnet recess 254 (FIG. 2). Front Hall effect sensor 360 can be configured to detect changes in magnetic force and to sense the proximity of top cover magnet 123 (FIG. 1) to front magnet 255 (FIG. 2), which can indicate that tablet keyboard case is in a closed configuration (as shown in FIG. 9, described below). Control circuitry can be configured to turn off keyboard 204 (FIG. 2) when front Hall effect sensor 360 detects that top cover magnet 123 (FIG. 1) is in close proximity to front magnet 255 (FIG. 2) due to the increased magnetic force detected by front Hall effect sensor 360.

Turning ahead in the drawings, FIG. 4 illustrates an exploded view showing various elements of tablet cover assembly 120 and hinge assembly 130. In various embodiments, tablet cover assembly can include a back cover 400 and a cover frame 410. Back cover 400 can include a cover perimeter frame 401 extending around the perimeter of top region 121 and bottom region 122, one or more cover sides 402 extending out from cover perimeter frame 401, a cover attachment region 403 inside cover perimeter frame 401 extending longitudinally across top region 121 to each inner side of cover perimeter frame 401, and a cover slot 404 in bottom region 122 extending longitudinally across each inner side of inside cover perimeter frame 401 in bottom region 122. Cover perimeter frame 401 can be substantially rectangular and have dimensions substantially the same as keyboard case surface 201 (FIG. 2), and can be of sufficient dimension to hold and secure the tablet computing device. Back cover 400 can be made of a suitable rigid polymer (e.g., PC or ABS), metal (e.g., aluminum), and/or ceramic material.

In a number of embodiments, cover frame 410 can be configured to fit within cover perimeter frame 401 and cover sides 402, and can be configured to receive and fittingly secure the tablet computing device. Cover frame 410 can include one or more frame sides 411, which can be configured to hold the back and sides of the tablet computing device. Frame sides 411 can form a frame lip 412, which, in some embodiments, can wrap around sufficiently to fittingly secure the tablet computing device. Frame lip 412 may be positioned around a portion of one or more edges of the front surface of the tablet computing device to secure it, but can in many embodiments leave the screen of the tablet computing device exposed for a user to manipulate. Cover frame 410 can include a frame face 413, which can be substantially planar and configured to rest against keyboard cover 210 (FIG. 2) when tablet keyboard case 100 (FIG. 1) is in a closed configuration (as shown in FIG. 9, described below). Cover frame 410 can be made of a suitable thermoplastic elastomer (TPE) (e.g., thermoplastic polyurethane (TPU)) or semi-rigid polymer. Top cover magnet 123 can be located at top region 121 of tablet cover assembly 120, and can be positioned in cover frame 410 or cover side 402 such that top cover magnet 123 can magnetically couple to front magnet 255 (FIG. 2) when tablet keyboard case 100 is in a closed configuration (as shown in FIG. 9, described below). Bottom cover magnet 124 can be located at bottom region 122 of tablet cover assembly 120, and can be positioned in cover frame 410 or cover sides 402, and can be positioned such that bottom cover magnet 124 can magnetically couple to central magnets 265 (FIG. 2) when tablet keyboard case 100 (FIG. 1) is in an open keyboard configuration (as shown in FIG. 10, described below).

In many embodiments, hinge assembly 130 can be configured to attach to cover attachment region 403 of tablet cover assembly 120 and to hinge connector frame 271 (FIG. 2) of keyboard assembly 110 (FIGS. 1 and 2), and can provide a connective hinge between bottom region 122 of tablet cover assembly 120 and back region 208 (FIG. 2) of keyboard assembly 110 (FIGS. 1 and 2). Hinge assembly 130 can include an inner layer 430, an outer layer 440, a hinge attachment piece 450, a hinge spine piece 460, and/or a hinge cover piece 470. Hinge attachment piece 450, hinge spine piece 460, and hinge cover piece 470 can be adhered between inner layer 430 and outer layer 440 to give a rigid structure to hinge assembly 130. In many embodiments, hinge assembly 130 does not include hinge spine piece 460. Inner layer 430 and/or outer layer 440 can be made of fabric, leather, or a thin polymer, such as polypropylene or polyethylene. Fabric construction can be inexpensive and provide a thin profile with flexibility at hinge bend points (e.g., 510, 520, and 530, as shown in FIG. 5 and described below). Polymers such as polypropylene or polyethylene can include living hinges at hinge bend points (e.g., 510, 520, and 530, as shown in FIG. 5 and described below) to provide flexibility. In some embodiments, inner layer 430 and/or outer layer 440 can extend longitudinally across cover slot 404 to the inner sides of cover perimeter frame 401, and in many embodiments can extend longitudinally across hinge connector frame 271 (FIG. 2).

In some embodiments, hinge attachment piece 450 can extend longitudinally along hinge connector frame 271 (FIG. 2), and can give structural support to inner layer 430 and outer layer 440 for attaching hinge assembly 130 to hinge connector frame 271 (FIG. 2). Hinge attachment piece 450 can be made of a suitable rigid polymer (e.g., PC or ABS), metal (e.g., aluminum), and/or ceramic material. In some embodiments, hinge attachment piece 450 can be substantially planar and can be die cut. In many embodiments, hinge attachment piece 450 can be adhered between inner layer 430 and outer layer 440, and together, hinge attachment piece 450, inner layer 430, and outer layer 440 (collectively, hinge keyboard attachment region 610, shown in FIG. 6, as described below) can be attached to hinge connector frame 271 (FIG. 2). In a number of embodiments, inner layer 430 includes one or more inner holes 431, outer layer 440 includes one or more outer holes 441, and/or hinge attachment piece 450 includes one or more hinge attachment holes 451, in which inner holes 431, hinge attachment holes 451, and outer holes 441 can be aligned and located in hinge keyboard attachment region 610 (shown in FIG. 6, as described below). The nubs 272 (FIG. 2) of hinge connector frame 271 (FIG. 2) can, in some embodiments, interlock inside inner holes 431, hinge attachment holes 451, and outer holes 441 to securely attach hinge assembly 130 to keyboard assembly 110 (FIGS. 1 and 2). In other embodiments, inner layer 430, outer layer 440, and/or hinge attachment piece 450 can include ribs, texturing, or other attachment mechanisms configured to interlock securely with hinge connector frame 271 (FIG. 2).

In several embodiments, hinge spine piece 460 can extend longitudinally across inner layer 430 and outer layer 440, and can have a width extending from the plane of keyboard case 200 (FIG. 2) to the plane of back cover 400 when tablet keyboard case 100 is in a closed configuration (as shown in FIG. 9, described below). Hinge spine piece 460 can be made of a suitable rigid polymer (e.g., PC or ABS), metal (e.g., aluminum), and/or ceramic material. In some embodiments, hinge attachment piece 450 can be made by injection molding a polymer. In many embodiments, hinge spine piece 460 can be curved across its width to provide a rounded spine to hinge assembly 130. In various embodiments, hinge spine piece 460 can be adhered between inner layer 430 and outer layer 440, and together, hinge spine piece 460, inner layer 430, and outer layer 440 (collectively, hinge spine region 620, shown in FIG. 6, as described below) can provide a rigid spine to hinge assembly 130. In a number of embodiments, hinge spine piece 460 is not included between inner layer 430 and outer layer 440.

In various embodiments, hinge cover piece 470 can extend longitudinally across inner layer 430 and outer layer 440, and can have a width substantially similar to the width of cover slot 404. Hinge cover piece 470 can be made of a suitable rigid polymer (e.g., PC or ABS), metal (e.g., aluminum), and/or ceramic material. In some embodiments, hinge cover piece 470 can be substantially planar and can be die cut. In various embodiments, hinge cover piece 470 can be adhered between inner layer 430 and outer layer 440, and together, hinge cover piece 470, inner layer 430, and outer layer 440 (collectively, hinge bottom cover region 630, shown in FIG. 6, as described below) can provide a rigid cover to hinge assembly 130. Hinge bottom cover region 630 (shown in FIG. 6, as described below) can partially or fully fill and/or cover the region of cover slot 404 when tablet computer case 100 is in a closed configuration (as shown in FIG. 9, described below), thus providing a rigid cover to the tablet computing device when tablet computer case 100 is closed.

Turning ahead in the figures, FIG. 5 illustrates a side isometric sectional view of tablet keyboard case 100 in an open keyboard configuration (as is also shown in FIG. 10, described below), showing hinge assembly 130 attached to cover attachment region 403 of tablet cover assembly 120 and to hinge connector frame 271 (FIG. 2) of keyboard assembly 110. In certain embodiments, hinge attachment piece 450, hinge spine piece 460, and hinge cover piece 470, can be adhered between inner layer 430 and outer layer 440 to give a rigid structure to hinge assembly 130. Cover attachment region 403 can be adhered between inner layer 430 and outer layer 440 to securely attach hinge assembly 130 to top cover assembly 120. Hinge assembly 130 can include a bottom hinge 510 extending longitudinally across inner layer 430 and outer layer 440 between hinge attachment piece 450 and hinge spine piece 460. Hinge assembly 130 can include a top hinge 520 extending longitudinally across inner layer 430 and outer layer 440 between hinge spine piece 460 and hinge cover piece 470. Hinge assembly 130 can include a cover hinge 530 extending longitudinally across inner layer 430 and outer layer 440 between hinge cover piece 450 and cover attachment region 403. In some embodiments, inner layer 430 and/or outer layer 440 can be laminated together with a flexible adhesive to hinge attachment piece 450, hinge spine piece 460, hinge cover piece 470, and cover attachment region 403, which can provide for flexible bending at bottom hinge 510, top hinge 520, and/or cover hinge 530. In other embodiments, inner layer 430 and/or outer layer 440 can be laminated together with a rigid adhesive to hinge attachment piece 450, hinge spine piece 460, hinge cover piece 470, and cover attachment region 403, but the rigid adhesive is not applied at bottom hinge 510, top hinge 520, and/or cover hinge 530 in order to provide for flexible bending at the hinge points (e.g., 510, 520, and 530). In some embodiments, a fabric welding process, such as the Bemis Sewfree® fabric welding process, is used to laminate inner layer 430 and/or outer layer 440 together and to the inner structural pieces (e.g., 450, 460, 470, and 403).

In some embodiments, when tablet keyboard case 100 is in an open keyboard configuration (as is also shown in FIG. 10, described below), cover slot 404 is not filled or covered by hinge bottom cover region 630 (shown in FIG. 6 and described below). Using cover slot 404 instead of an additional cover backing piece on back cover 400 can, in some embodiments, allow for hinge bottom cover region 630

(shown in FIG. 5 and described below) of hinge assembly 130 to fit within cover slot 404. Thus, cover slot 400 can, in various embodiments, allow tablet keyboard case 100 to have a thinner overall thickness when in a closed configuration (shown in FIG. 9, described below) than in embodiments where an additional cover backing piece is used on back cover 400 (FIG. 4) in place of (or to fill) cover slot 404.

Turning ahead in the drawings, FIG. 6 illustrates a side isometric sectional view of keyboard assembly 110 and hinge assembly 130. In a number of embodiments, hinge assembly 130 can include a hinge keyboard attachment region 610, a hinge spine region 620, and a hinge bottom cover region 630. Hinge keyboard attachment region 610 can include hinge attachment piece 450, and the portions of inner layer 430 and outer layer 440 adhered to hinge attachment piece 450. Hinge keyboard attachment region 610 can attach to hinge connector frame 271 (FIG. 2). Hinge spine region 620 can include hinge spine piece 460, and the portions of inner layer 430 and outer layer 440 adhered to attachment piece 460. Bottom hinge 510 can be located between hinge keyboard attachment region 610 and hinge spine region 620. Hinge bottom cover region 630 can include hinge cover piece 470, and the portions of inner layer 430 and outer layer 440 adhered to hinge cover piece 470. Top hinge 520 can be located between hinge spine region 620 and hinge bottom cover region 630. In a number of embodiments, hinge bottom cover region 630 can be rotated away from a back of the tablet computing device when the case is in an open keyboard configuration (such as shown in FIG. 10).

Turning ahead in the drawings, FIG. 7 illustrates a side isometric section view of tablet cover assembly 120 and hinge assembly 130. In many embodiments, a hinge top cover region 700 can include cover attachment region 403 and the portions of inner layer 430 and outer layer 440 adhered to cover attachment region 403. In some embodiments, the thickness of cover attachment region 403 can be less than the thickness of cover perimeter frame 401. In a number of embodiments, the inner face of cover attachment region 403 can be recessed slightly below the inner face of cover perimeter frame 401 and/or the outer face of cover attachment region 403 can be recessed slightly below the outer face of cover perimeter frame 401. In various embodiments, when inner layer 430 is attached to the inner face of cover attachment region 403, the face of inner layer 430 can be co-planar with the inner face of cover perimeter frame 401. In other embodiments, the thickness of inner layer 430 can slightly greater than the depth of the recess between the inner face of cover attachment region 403 and cover perimeter frame 403, and the inner layer can protrude slightly above the inner face of cover perimeter frame 403 and not be co-planar, in which inner layer 430 can provide a backing or padding surface for the back of the tablet computing device. In some embodiments, hinge attachment piece 450, hinge spine piece 460, hinge cover piece 470 (FIG. 4), and cover attachment 403 can have substantially the same thickness, and in other embodiments, may have different thicknesses.

Figure 8:
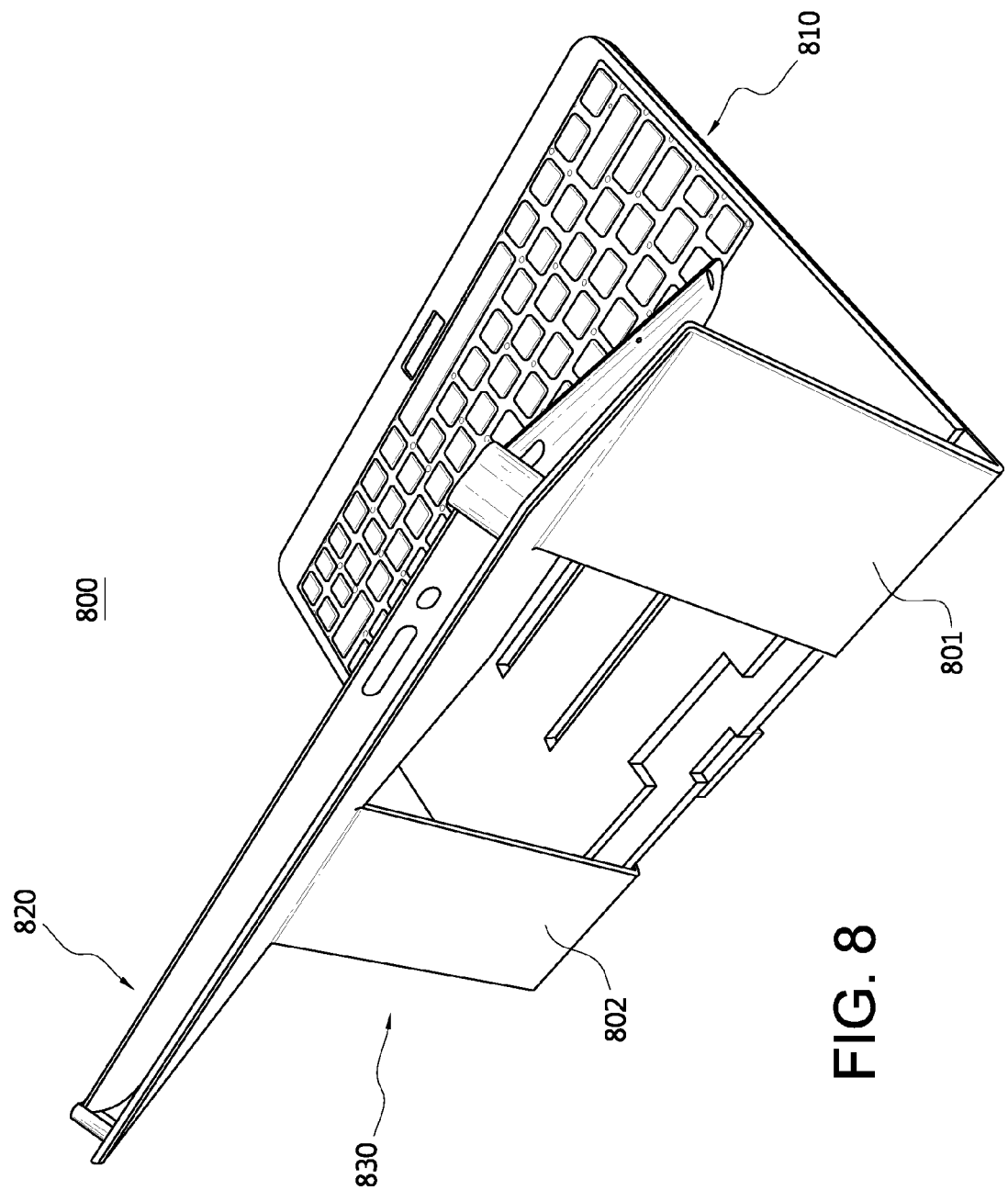
FIG. 8 illustrates a top left back side isometric view of a tablet keyboard case, according to another embodiment.

Turning ahead in the drawings, FIG. 8 illustrates a back side isometric view of a tablet keyboard case 800 in an open keyboard configuration (as is also shown in FIG. 10, described below). Tablet keyboard case 800 can be similar to tablet keyboard case 100 and various components and/or constructions of tablet keyboard case 800 can be identical to various components of tablet keyboard case 100. In many embodiments, tablet keyboard case 800 can include a keyboard assembly 810, a tablet cover assembly 820, and/or a hinge assembly 830. Keyboard assembly 810 can be similar to keyboard assembly 110 (FIGS. 1-2), and various components and/or constructions of keyboard assembly 810 can be identical or substantially similar to various components of keyboard assembly 110 (FIGS. 1-2). Keyboard assembly 110 can be an example of a cover. Tablet cover assembly 820 can be similar to tablet cover assembly 120 (FIGS. 1 and 4), and various components and/or constructions of tablet cover assembly 820 can be identical or substantially similar to various components of tablet cover assembly 120 (FIGS. 1 and 4). Tablet cover assembly 820 can be an example of a cover.

In some embodiments, hinge assembly 830 can include more than one set of inner layer 430, outer layer 440, hinge attachment pieces 450, hinge spine piece 460, and/or hinge cover piece 470 (FIG. 4), and can be similar to hinge assembly 130 (FIG. 1). For example, hinge assembly 830 can include left hinge assembly piece 801 and right hinge assembly piece, which each can include an inner layer (not shown, which can be similar to inner layer 430 (FIG. 4)), an outer layer (not shown, which can be similar to outer layer 440 (FIG. 4)), hinge attachment pieces (not shown, which can be similar to hinge attachment pieces 450 (FIG. 4)), a hinge spine piece (not shown, which can be similar to hinge spine piece 460 (FIG. 4)), and/or a hinge cover piece (not shown, which can be similar to hinge cover piece 470 (FIG. 4)), and can provide a hinge mechanism between keyboard assembly 810 (e.g., on one or more hinge connector frames, which can be similar to hinge connector frames 271 (FIG. 2)) and tablet cover assembly 820. In other embodiments, the hinge spine piece is not included between the inner layer and the outer layer.

Turning ahead in the drawings, FIG. 9 illustrates a side isometric view of tablet keyboard case 800 in a closed configuration. In a closed configuration, a top cover magnet (not shown, which can be similar to top cover magnet 123 (FIGS. 1 and 4)) can, in some embodiments, magnetically couple to a front magnet (not shown, which can be front magnet 255 (FIG. 2)), and/or hinge assembly 830 can attach (e.g., physically, magnetically, etc.) a bottom region 922 to a back region 908, to hold tablet cover assembly 820 and keyboard assembly 810 in a closed configuration. In a closed configuration, in certain embodiments, keyboard 904 can be covered and a screen of the tablet computing device can be covered. In some embodiments, keyboard assembly 810 and tablet cover assembly 820 can surround the tablet computing device in a rigid enclosure in the closed configuration. In various embodiments, a frame face (not shown, which can be similar to frame face 413 (FIG. 4)) can rest against a keyboard cover 911. In a number of embodiments when in closed configuration, top region 921 of tablet cover assembly 820 can be positioned in close proximity to and substantially parallel to a front region 907 of keyboard assembly 810, and bottom region 922 of tablet cover assembly 820 can be positioned in close proximity to and substantially parallel to back region 908. In various embodiments, in the closed configuration, tablet cover assembly 820 and keyboard assembly 810 can securely hold and partially or fully surround a keyboard 904 and/or the tablet computing device. In the closed configuration, keyboard 904 can be turned off automatically and/or kept off.

Turning ahead in the figures, FIG. 10 illustrates a side elevational view of tablet keyboard case 800 in an open keyboard configuration. When tablet keyboard case 800 is in an open keyboard configuration, in a number of embodiments, keyboard 904 can be uncovered and a screen of the tablet computing device can be uncovered. As explained above, the keyboard can be turned on when sensors (not shown, which can be similar to central Hall effect sensors 300 (FIG. 3)) detect that the case is in the open keyboard configuration. In some embodiments, tablet cover assembly 820 can be positioned such that top region 921 (FIG. 9) is positioned above bottom region 922, and such that bottom region 922 touches keyboard assembly 810, but top region 921 (FIG. 9) does not touch keyboard assembly 810. In a number of embodiments, tablet cover assembly 820 can be positioned on keyboard cover 911 when tablet keyboard case 800 is in an open keyboard configuration.

In an open keyboard configuration, in various embodiments, a bottom cover magnet (not shown, which can be similar to bottom cover magnet 124 (FIGS. 1 and 4)) can be magnetically coupled to one of central magnets (not shown, which can be similar to central magnets 265 (FIG. 2)), and/or the bottom cover magnet or a protrusion from tablet cover assembly 820 can be physically secured in one of central cover recesses 1015 (which can be similar to central cover recess 215 (FIG. 2). Central cover recesses 1015 can be examples of attachment mechanisms. The bottom cover magnet in some embodiments can be positioned to magnetically couple with other central magnets and/or be physically secured in other central cover recesses 1015 to provide different viewing angles for tablet cover assembly 820. In some embodiments, the bottom cover magnet as well as central cover recesses 1015 and/or the central magnets can hold tablet cover assembly 820 at two or more viewing angles in the open keyboard configuration. In various embodiments, the bottom cover magnet as well as central cover recesses 1015 and/or the central magnets can hold tablet cover assembly 820 at three or more viewing angles in the open keyboard configuration.

Hinge assembly 830 can in some embodiments provide rigid support to prop up the back of tablet cover assembly 820 and secure it in a desired viewing angle. In many embodiments, a hinge bottom cover region 1030 (which can be similar to hinge bottom cover region 630 (FIG. 6)) can provide a rigid back support. When opening tablet keyboard case 800 from a closed configuration (e.g., as shown in FIG. 9), a user can, in some embodiments, lift tablet cover assembly 820 from keyboard assembly 810 and can magnetically decouple the top cover magnet from the front magnet. In many embodiments, tablet cover assembly 820, when opened, can fold axially around a bottom hinge 1010, a top hinge 1020, and a cover hinge 1130 (FIG. 11, described below). In the open keyboard configuration, in various embodiments, keyboard 904 will be turned on automatically and/or kept on, and a user can type on the keyboard and provide input to the tablet computing device.

Turning ahead in the drawings, FIG. 11 illustrates a side elevation view of tablet keyboard case 800 in an open tablet configuration. In an open tablet configuration, in many embodiments, keyboard 904 can be covered and the screen of the tablet computing device can be uncovered. In some embodiments, a top surface of keyboard 904 can be covered by the tablet computing device when the tablet keyboard case 800 is in the open tablet configuration. In various embodiments, a top surface of keyboard 904 can be covered by the tablet cover assembly 820 when tablet keyboard case 800 is in the open tablet configuration. In the open tablet configuration, in various embodiments, top region 921 of tablet cover assembly 120 can be positioned in close proximity to and substantially parallel to back region 908 of keyboard assembly 810, and bottom region 922 of tablet cover assembly 820 can be positioned in close proximity to and substantially parallel to front region 907 of keyboard assembly 810, which can, in various embodiments, allow the touchscreen of the tablet computing device to be uncovered and accessible for user manipulation. In the open tablet configuration, in some embodiments, the bottom magnet of tablet cover assembly 820 and the front magnet of keyboard assembly 810 can have a sufficient magnetic field to allow the bottom magnet to magnetically couple to the front magnet and keep tablet keyboard case 800 in the open tablet configuration. In other embodiments, the bottom magnet does not couple to the front magnet. In some embodiments, the bottom region of tablet cover assembly 820 attaches to the front region 907 of keyboard assembly 100 using a suitable attachment mechanism, such as a snap. In various embodiments, hinge assembly 830 can fold axially along cover hinge 1130 to allow the outer face of hinge bottom cover region 1030 to rest flush against or be proximate to the outer face of a hinge top cover region 1140, and hinge assembly 830 can fold axially along top hinge 1020 to allow the inner face of hinge bottom cover region 1030 to rest flush against or be proximate to keyboard cover 911. In open tablet configuration, in various embodiments, keyboard 904 is turned off automatically and/or kept off, and keys 1105 of keyboard 904 are covered and protected by a back cover (not shown, which can be similar to back cover 400 (FIG. 4)) of tablet cover assembly 120.

Turning ahead in the drawings, FIG. 12 illustrates a side elevational view of tablet keyboard case 100 in a closed configuration (as shown and described in FIG. 10). When tablet keyboard case 100 includes a tablet computing device, the total thickness of keyboard case 100 can, in some embodiments, be between approximately 18.0 millimeters (mm) and approximately 19.0 mm. In many embodiments, keyboard case 100 can have a thickness of less than 19 mm. Back cover 400 (FIG. 4) can, in various embodiments, have a thickness between approximately 3.0 mm and approximately 3.5 mm. The tablet computing device, such as the iPad, can have a thickness of approximately 9.3 mm. Keyboard assembly 110 (FIGS. 1 and 2) can, in a number of embodiments, have a thickness between approximately 6.0 mm and approximately 6.5 mm.

Turning ahead in the drawings, FIG. 13 illustrates a top plan view of tablet keyboard case 100 in a closed configuration. In various embodiments, tablet keyboard case 100 can include various holes, grooves, and/or slots which can allow a user to connect plugs for peripherals or other connectors to the tablet computing device when it is secured in tablet cover assembly 120, and which can provide an aperture to allow sound waves and/or electromagnetic waves, such as light, to pass through. For example, FIG. 13 shows tablet cover assembly 120 including various slots configured for an iPad, including a dock connector slot 1310 configured to allow an iPad docking cable to connect to the iPad's dock connector, a speaker slot 1320 configured to allow sound from the iPad speaker to pass through and not be as muffled by tablet cover assembly 120, a button slot 1330 configured to allow a user to manipulate volume buttons on the iPad, a camera slot 1340 configured to allow light to pass through tablet cover assembly 120 to the iPad's back camera, a sleep slot 1350 configured to allow a user to manipulate the iPad's sleep/wake button, a microphone slot 1360 configured to allow sound to pass through tablet cover assembly 120 to the iPad's microphone, and audio slot 1370 configured to allow an audio jack to connect the iPad's audio receptacle. In other embodiments, various other holes, grooves, and/or slots are included for various other configurations of tablet computing devices.

Figure 14:
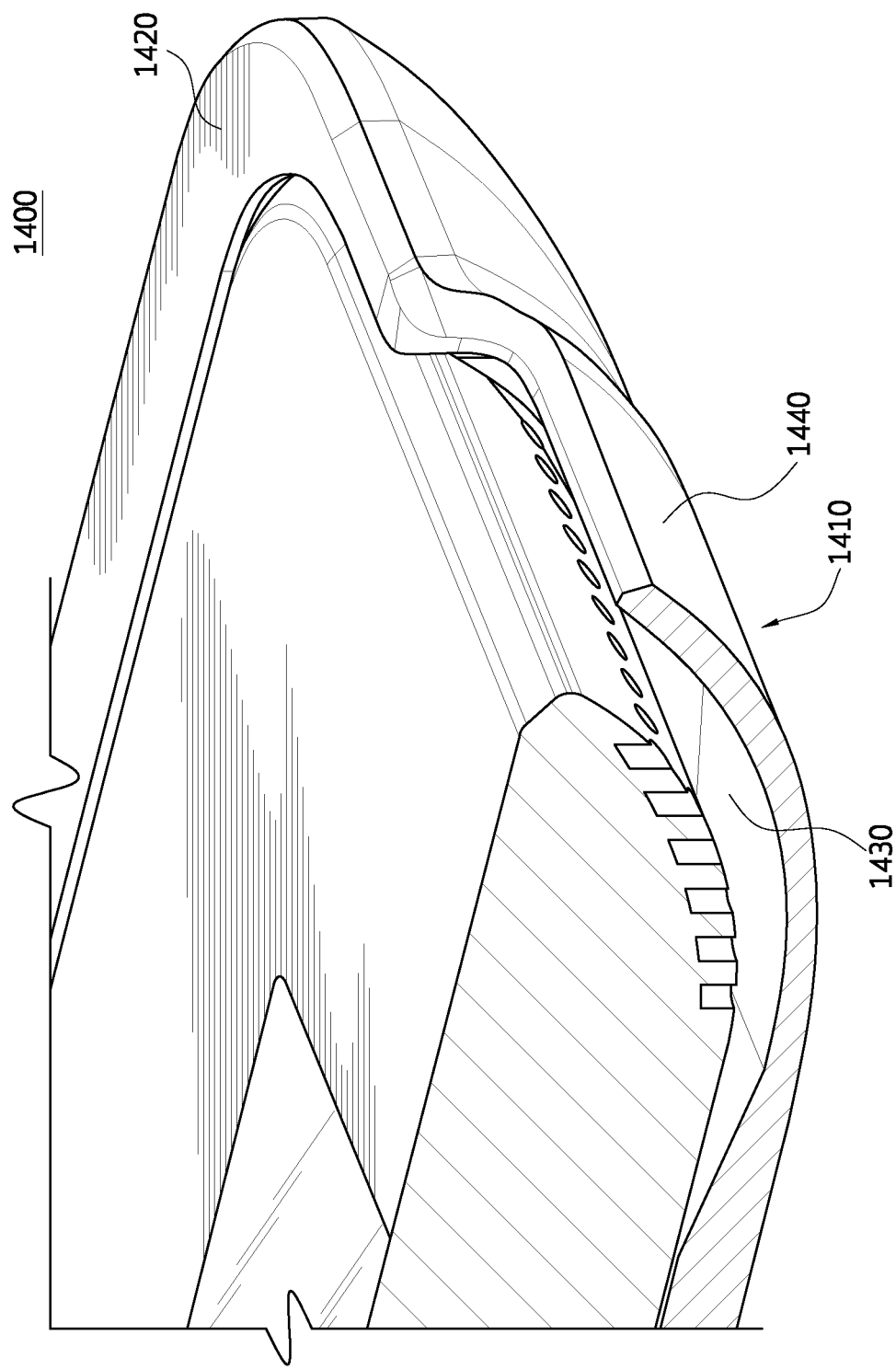
FIG. 14 illustrates a right side isometric cross-sectional view of a tablet keyboard case, according to another embodiment.

Turning ahead in the drawings, FIG. 14 illustrates a side isometric section view of tablet keyboard case 1400. Tablet keyboard case 1400 can be similar to tablet keyboard case 100, and various components of tablet keyboard case 1400 can be identical to various components of tablet keyboard case 100. Instead of including speaker slot 1320 (FIG. 12), tablet keyboard case 1400 can include a speaker bulge 1410 located on a tablet cover assembly 1420. Tablet cover assembly 1420 can be similar to tablet cover assembly 120 (FIGS. 1 and 4) and/or tablet cover assembly 820 (FIG. 8), and various components and/or constructions of tablet cover assembly 1420 can be identical or substantially similar to various components of tablet cover assembly 120 (FIGS. 1 and 4) and/or tablet cover assembly 820 (FIG. 8). Tablet cover assembly 1420 can be an example of a cover. In some embodiments, speaker bulge 1410 can include an inner region 1430 and an outer region 1440. Inner region 1430 can be recessed and/or cored out in the area of tablet cover assembly 1420 that is located adjacent to the tablet computing device's speaker, and inner region 1430 can extend to an inner side of tablet cover assembly 1420. Speaker bulge 1410 in some embodiments can provide a sufficient space between the tablet computing device and inner region 1430 to redirect sound waves from the tablet computing device's speaker toward the side and/or front face of the tablet computing device. In some embodiments, outer region 1440 is co-planar with the outer face of tablet cover assembly 1420. In a number of embodiments, the thickness of speaker bulge 1410 is less than the thickness of tablet cover assembly 1420. In various embodiments, outer region 1440 is not co-planar with the outer face of tablet cover assembly 1420, and outer region 1440 protrudes from the face of tablet cover assembly 1420, and/or inner region 1430 is not cored out of tablet cover assembly 1420.

Turning ahead in the drawings, FIG. 15 illustrates a flow chart for an embodiment of method 1500 of providing a tablet keyboard case. Method 1500 is merely exemplary and is not limited to the embodiments presented herein. Method 1500 can be employed in many different embodiments or examples not specifically depicted or described herein. In some embodiments, the procedures, the processes, and/or the activities of method 1500 can be performed in the order presented. In other embodiments, the procedures, the processes, and/or the activities of the method 1500 can be performed in any other suitable order. In still other embodiments, one or more of the procedures, the processes, and/or the activities in method 1500 can be combined or skipped.

Referring to FIG. 15, method 1500 can include procedure 1501 of providing a first cover. In many embodiments, the first cover can be similar or identical to tablet cover assembly 120 (FIG. 1), tablet cover assembly 820 (FIG. 8), and/or tablet cover assembly 1420 (FIG. 14). In certain embodiments, the first cover can be configured to hold the tablet computing device. In a number of embodiments, the first cover can include a first attachment mechanism. In some embodiments, the first attachment mechanism can be similar or identical to bottom cover magnet 124 (FIG. 1).

Method 1500 can continue with procedure 1502 of providing a second cover. In several embodiments, the second cover can be similar or identical to keyboard assembly 110 (FIG. 1) and/or keyboard assembly 810 (FIG. 1). In many embodiments, the second cover can include a keyboard. In certain embodiments, the keyboard can be similar or identical to keyboard 204 (FIG. 2) and/or keyboard 904 (FIG. 9). In some embodiments, the second cover can include one or more second attachment mechanisms. In a number of embodiments, the second attachment mechanisms can be similar or identical to central cover recesses 215 (FIG. 2), central cover recesses 1015 (FIG. 10) and/or central magnets 265 (FIG. 2). In many embodiments, the second cover can include one or more sensors. In several embodiments, the sensors can similar or identical to central Hall effect sensors 300 (FIG. 3). In some embodiments, the first attachment mechanism can be configured to couple with the second attachment mechanisms to hold the case in an open keyboard configuration. In an open keyboard configuration, in many embodiments, the keyboard can be uncovered and the screen of the tablet computing device can be uncovered, similarly as shown in FIG. 10. In a number of embodiments, the keyboard can be turned on when the sensors detect that the case is in the open keyboard configuration.

Although the tablet keyboard case has been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-15 may be modified, and that the foregoing discussion of certain of these embodiments does not necessarily represent a complete description of all possible embodiments. For example, one or more of the procedures, processes, or activities of FIG. 15 may be include different procedures, processes, and/or activities and be performed by many different modules, in many different orders.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A case for a tablet computing device, the case comprising:
    a first cover configured to hold the tablet computing device, the first cover comprising a first attachment mechanism;
    a second cover comprising:
        a keyboard;
        one or more second attachment mechanisms; and
        one or more sensors; and
    a spine assembly comprising a hinge bottom cover region, wherein:
        the first attachment mechanism is configured to couple with the one or more second attachment mechanisms to hold the case in an open keyboard configuration such that the keyboard is uncovered and a screen of the tablet computing device is uncovered;

the keyboard is automatically turned on when the one or more sensors detect that the case is in the open keyboard configuration;

the keyboard is automatically turned off when the one or more sensors detect that the case is not in the open keyboard configuration;

the case is configured to fold into a closed configuration such that the keyboard is covered by the case and the screen of the tablet computing device is covered by the case;

the first cover comprises a cover slot; and the hinge bottom cover region covers the cover slot when the case is in the closed configuration.

2. The case of claim 1, wherein:

the one or more second attachment mechanisms comprise two or more second attachment mechanisms; and the first attachment mechanism is configured to couple with each of the two or more second attachment mechanisms to hold the first cover at two or more viewing angles in the open keyboard configuration.

3. The case of claim 1 comprising:

an antenna, wherein:

the case is configured to wirelessly transmit keyboard input data to the tablet computing device via the antenna.

4. The case of claim 1, wherein:

the first and second covers are configured to surround the tablet computing device in a rigid enclosure in the closed configuration.

5. The case of claim 1, wherein:

the case has a thickness of less than 19 mm when the case is in the closed configuration.

6. The case of claim 1, wherein:

the second cover comprises a sleep magnet located such that a sleep sensor in the tablet computing device detects the sleep magnet when the case is in the closed configuration and turns off the tablet computing device.

7. The case of claim 1 wherein:

the hinge bottom cover region is rotated away from a back of the tablet computing device when the case is in the open keyboard configuration.

8. The case of claim 1, wherein:

the first cover comprises at least one of a dock connector slot, a speaker slot, a button slot, a camera slot, a sleep slot, a microphone slot, or an audio slot.

9. The case of claim 1, wherein:

the first attachment mechanism comprises a first magnet;

the one or more second attachment mechanisms comprise one or more second magnets configured to couple to the first magnet;

the second cover comprises a keyboard cover; and the first cover is positioned on the keyboard cover when the case is in the open keyboard configuration.

10. The case of claim 1, wherein:

the first cover comprises a top cover magnet;

the second cover comprises a front magnet; and the top cover magnet is configured to couple with the front magnet to hold the first and second covers in the closed configuration.

11. The case of claim 1, wherein:

the case is configured to fold into an open tablet configuration such that the keyboard is covered and the screen of the tablet computing device is uncovered.

12. The case of claim 11, wherein:

a top surface of the keyboard is covered by the tablet computing device when the case is in the open tablet configuration.

13. The case of claim 12, wherein:

the top surface of the keyboard is covered by the first cover when the case is in the open tablet configuration.

14. The case of claim 1, wherein:

the first attachment mechanism comprises a first magnet;

the second cover comprises a front magnet; and the first magnet is configured to couple with the front magnet to hold the first and second covers in an open tablet configuration such that the keyboard is covered and the screen of the tablet computing device is uncovered.

15. A case for a tablet computing device, the case comprising:

a first cover configured to hold the tablet computing device, the first cover comprising a first attachment mechanism; and a second cover comprising:

a keyboard;

one or more second attachment mechanisms; and one or more sensors, wherein:

the first attachment mechanism is configured to couple with the one or more second attachment mechanisms to hold the case in an open keyboard configuration such that the keyboard is uncovered and a screen of the tablet computing device is uncovered;

the keyboard is automatically turned on when the one or more sensors detect that the case is in the open keyboard configuration;

the keyboard is automatically turned off when the one or more sensors detect that the case is not in the open keyboard configuration;

the case is configured to fold into a closed configuration such that the keyboard is covered by the case and the screen of the tablet computing device is covered by the case; and the first cover comprises a speaker bulge.

16. The case of claim 15 further comprising:

a spine assembly comprising a hinge bottom cover region, wherein:

the first cover comprises a cover slot; and the hinge bottom cover region covers the cover slot when the case is in the closed configuration.

17. The case of claim 15, wherein:

the one or more second attachment mechanisms comprise two or more second attachment mechanisms; and the first attachment mechanism is configured to couple with each of the two or more second attachment mechanisms to hold the first cover at two or more viewing angles in the open keyboard configuration.

18. The case of claim 15, wherein:

the first and second covers are configured to surround the tablet computing device in a rigid enclosure in the closed configuration.

19. The case of claim 15, wherein:

the case is configured to fold into an open tablet configuration such that the keyboard is covered and the screen of the tablet computing device is uncovered.

20. The case of claim 15 further comprising:
a spine assembly comprising a hinge bottom cover region, wherein:
the hinge bottom cover region is rotated away from a back of the tablet computing device when the case is in the open keyboard configuration.

21. A method of providing a case for a tablet computing device comprising:
providing a first cover configured to hold the tablet computing device, wherein the first cover comprises a first attachment mechanism;
providing a second cover comprising a keyboard, one or more second attachment mechanisms, and one or more sensors; and
providing a spine assembly comprising a hinge bottom cover region,
wherein:
the first attachment mechanism is configured to couple with the one or more second attachment mechanisms to hold the case in an open keyboard configuration such that the keyboard is uncovered and a screen of the tablet computing device is uncovered;
the keyboard is turned on when the one or more sensors detect that the case is in the open keyboard configuration;
the keyboard is automatically turned off when the one or more sensors detect that the case is not in the open keyboard configuration;
the case is configured to fold into a closed configuration such that the keyboard is covered by the case and the screen of the tablet computing device is covered by the case;
the first cover comprises a cover slot; and
the hinge bottom cover region covers the cover slot when the case is in the closed configuration.

22. The method of claim 21, wherein:
the one or more second attachment mechanisms comprise two or more second attachment mechanisms; and
the first attachment mechanism is configured to couple with each of the two or more second attachment mechanisms to hold the first cover at two or more viewing angles in the open keyboard configuration.

23. The method of claim 21, wherein:
the first and second covers are configured to surround the tablet computing device in a rigid enclosure in the closed configuration.

24. The method of claim 21, wherein:
the case is configured to fold into an open tablet configuration such that the keyboard is covered and the screen of the tablet computing device is uncovered.

* * * * *